United States Patent Office 3,358,831
Patented Dec. 19, 1967

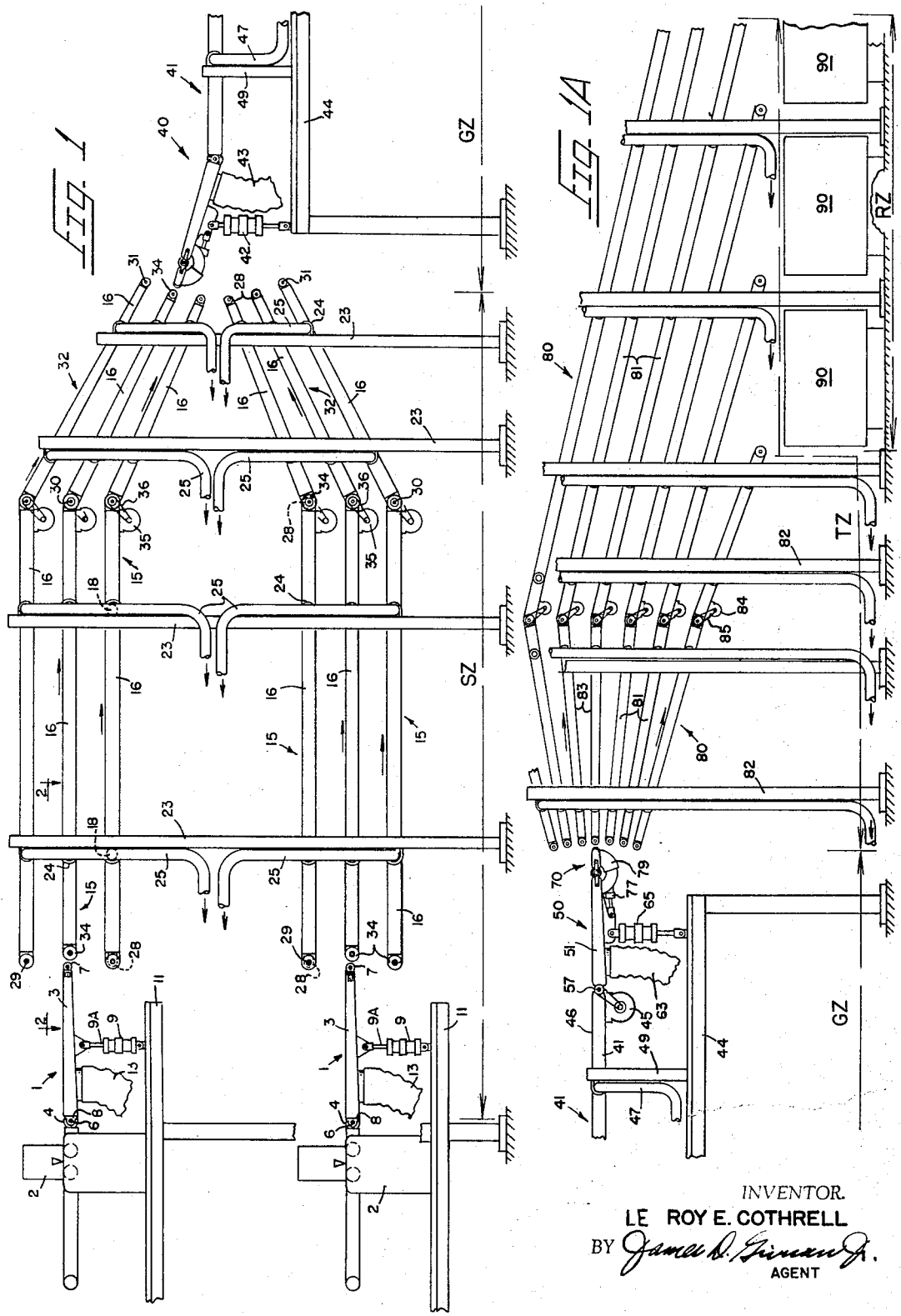

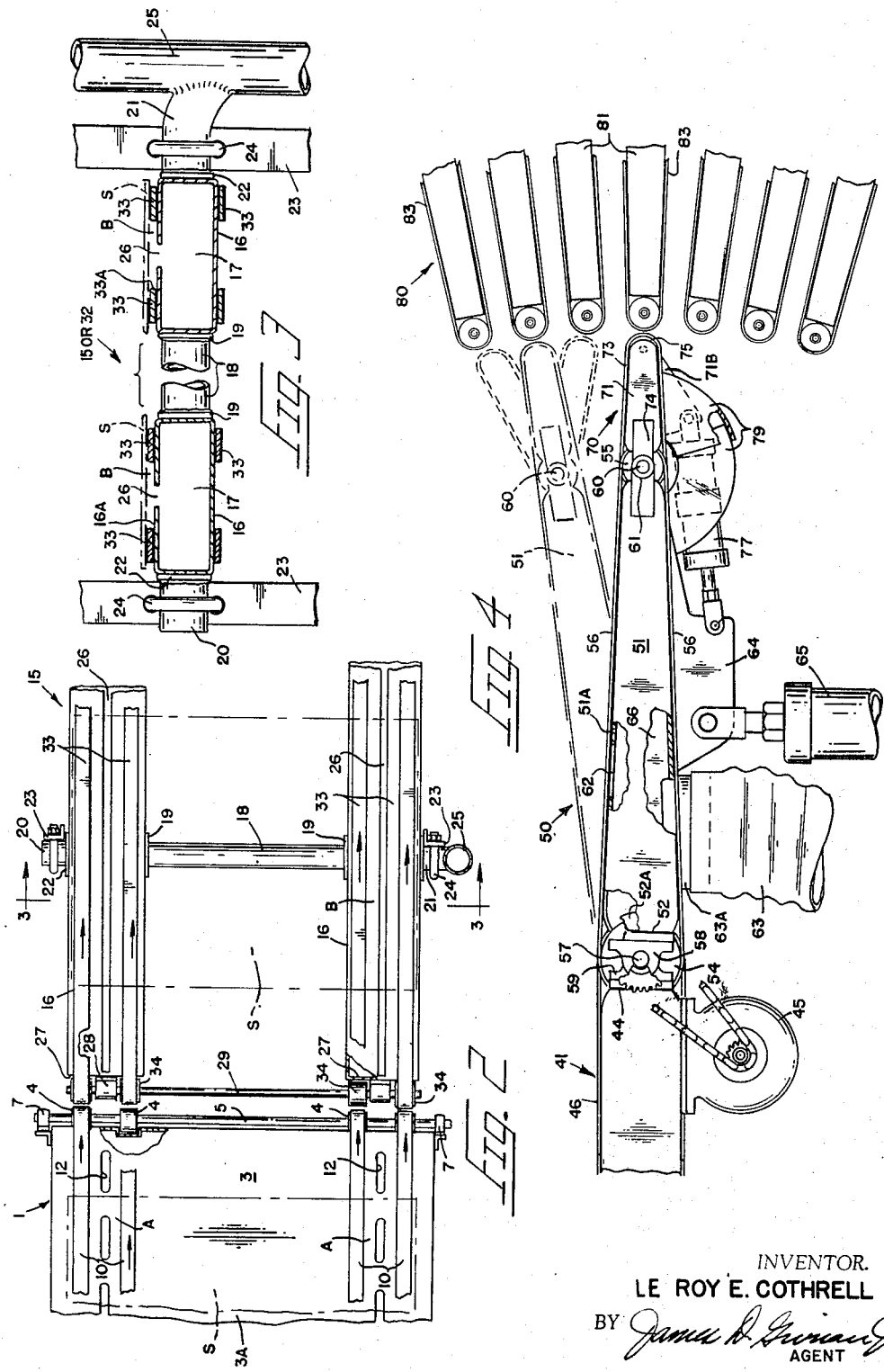

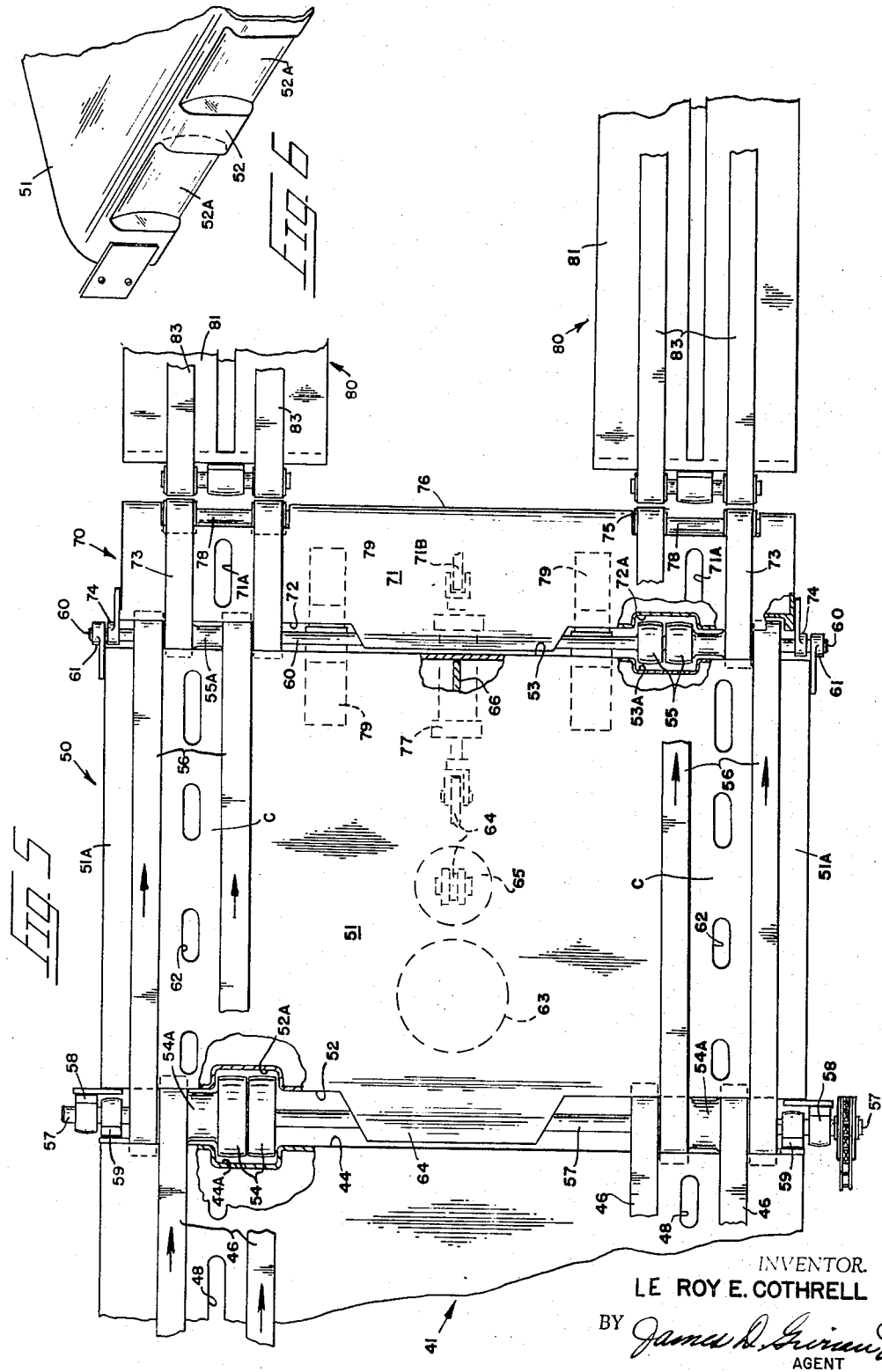

3,358,831
APPARATUS FOR AND METHOD OF SORTING
SHEET MATERIAL
Le Roy E. Cothrell, Box 696A, Lorane Route,
Cottage Grove, Oreg. 97424
Filed Sept. 3, 1965, Ser. No. 484,877
16 Claims. (Cl. 209—125)

ABSTRACT OF THE DISCLOSURE

An apparatus for the processing of successive sheets of material and particularly wood veneer sheets. The apparatus includes plural, vertically spaced apart trays for the storage and transfer of the sheet material. Tipple machines positionable within a vertical plane are used in conjunction with said trays for loading and off-loading the storage trays. An additional tipple machine discharges the sheets according to their grade and size onto one of several stacked transfer trays for eventual discharge into separate receiving areas. For sheet retention along inclined paths of the trays and tipple machines the sheet material is subjected to an area of reduced atmospheric pressure.

---

This invention relates to a method of and apparatus for providing storing, grading, transfer and receiving zones for material in sheet form and more particularly to a method and apparatus for transporting wood veneer sheets at a desired rate to a sorting or grading station and selectively discharging the sheets therefrom.

In typical veneer plants at present, veneer strips sliced from a rotating "peeler" log are eventually transferred to a clipper machine for cutting of the strips into standard length sheets for subsequent delivery one by one to a grading station attended by several men termed "graders." The sheets are subsequently manually diverted by the "graders" according to quality and size, to collecting bins where they are stacked for further processing. The sheets are delivered one at a time at irregular intervals along a single horizontal path from the clipper machine to the grading station where they are discharged in a lateral direction at spaced apart locations within the grading station. The sheets by reason of their thinness, one tenth to three sixteenths of an inch, are extremely flexible and hence unwieldly when manually sorted.

In view of the foregoing it is an important object of the present invention to provide an apparatus for the sorting of veneer sheets which allows the grading function to be performed by a single "grader" in a rapid and continuous manner resulting in an efficient operation. To achieve this object accurate and positive sheet transfer means in the form of a tipple mechanism are provided, operable in a vertical plane, and having areas of reduced air pressure associated therewith for retention of the veneer sheets during their movement along inclined paths.

Another important object of this invention is the provision of a plurality of vertically spaced storage trays for receiving and holding quantities of veneer sheets discharged from a pair of clipper machines. Adjacent both ends of the storage trays are additional transfer means positionable for the selective loading and unloading of veneer sheets from any one of the several trays. The temporary holding capability of the trays allows the veneer grading operation adjacent the off-loading end of the trays to proceed at a rate independent of the preceding clipping function and vice versa since variances in their fluctuating speeds of operation will be for the most part, compensated for by the storage capability of the trays.

A further object of this invention is the provision of sheet material conveying belts operable in conjunction with vacuum chambers to secure the veneer sheets against undesired movement relative to conveyor belts particularly while the belts are traveling inclined paths.

These and other objects and advantages of the present invention will become subsequently apparent upon study of the following specification and drawings referred to therein and in which;

FIGURES 1–1A is a diagrammatic, side elevational view, of the present invention providing contiguous zones for the storing, grading, transferring and receiving of sheet material. Although shown and described for processing wood veneer sheets it is to be understood that the present invention may be equally adaptable to the processing of other types of flexible sheet material, FIGURE 2 is a fragmentary, plan view taken along the line 2—2 of FIGURE 1 showing one end of a sheet transfer mechanism and a fragment of a storage tray adjacent thereto, FIGURE 3 is an elevational view taken along line 3—3 of FIGURE 2 on an enlarged scale and showing a section of sheet storing and transferring means in the form of a pair of belt supporting conveyor frames forming interior vacuum chambers for veneer sheet retention in the storing and transfer zones, FIGURE 4 is a fragmentary, side elevational view of sheet transfer means at the discharge end of the grading zone which is structurally identical with sheet off-loading means located at the forward end of the grading zone, FIGURE 5 is a plan view of the transfer means substantially as shown in FIGURE 4 including adjacent parts of the apparatus in fragmentary form, and FIGURE 6 is a fragmentary, perspective view of one corner of a typical vacuum box showing inset areas formed therein for the partial enclosure of pulleys associated therewith.

With continuing reference to the drawings and particularly FIGURES 1–1A and 2 thereof, the reference numeral 1 indicates generally a pair of identical, vertically spaced transfer mechanisms within the storage zone SZ which function independently of each other and in the general manner of a "tipple" machine which in the art is used to describe various machines all having members positionable in an inclined manner for the discharge of sheet material at various levels.

Each of the transfer mechanisms 1 of the storage zone includes a vacuum box 3 of rectangular shape provided at its ends with pulleys 4, carried by shafts 5 and 6 suitably journalled in bearings 7 and 8 respectively. The transfer mechanism is positioned about the horizontal axis of the shaft 6 by its respective air cylinder indicated at 9 acting through its multipositionable piston rod 9A. Pulleys 4 and endless belts 10 carried thereby are powered by the shaft 6 which in turn is driven by a power source associated with conveyor belts of the clipper machine 2.

The clipper machines 2 are commercially available as standard equipment, operable by an individual for the cutting and trimming of veneer strips into sheets of desired lengths. Spaced platforms 11 support clipper machines 2 and the transfer mechanisms 1 in a vertically spaced manner for the reception of independent and continuous veneer strips.

The belts 10 of the transfer mechanism (FIG. 2) are in pairs with each pair disposed adjacent opposite sides of the box 3 and each belt of each pair laterally spaced from a row of elongated openings 12 formed in the upper surface 3A of the box. A flexible conduit 13 secured to the underside of the box provides communication between the interior of the box 3 and a continuous source of vacuum such as an industrial blower (not shown). Upon advancement of the veneer sheet indicated at S onto the transfer mechanism 1 from the clipper 2 areas of reduced pressure indicated at A are formed. The areas so formed are defined by the underside of the sheet S, opposing edges of belts 10 of each pair and the upper surface 3A of the vacuum box 3.

Positioning of the transfer mechanism 1 about the horizontal axis of shaft 6 by means of the air cylinder 9 permits the clipper operator to selectively discharge sheets onto any one of the storage trays indicated generally at 15. Although FIGURES 1–1A show three vertically spaced or stacked storage trays for each transfer mechanism it is obvious that the cylinder 9 and control means therefor may include settings for positioning the discharge end of the transfer mechanism opposite additional storage trays or a waste conveyor.

The storage trays indicated generally at 15 and 32 complete the storage zone and are identical except for the inclination of the latter and hence a description of one storage tray will suffice for all. As shown in FIGURES 2 and 3 a typical storage tray 15–32 consists of a pair of elongated, horizontally spaced conveyor frames 16, rectangular in section and providing vacuum chambers 17 therein. Each pair of frames 16 is interconnected by a pair of tubular conduits 18 welded to reinforcing plates 19 mounted on the sides of the frames 16. In alignment with conduits 18 are tubular members 20 and 21 secured to the outer sides of the frames 16 by means of additional reinforcing plates 22. The frames 16 are supported by standards 23 by means of U-bolts 24 which clamp members 20 and 21 to the standards. Member 21 serves additionally to connect the right hand vacuum chamber 17 of FIGURE 3 with one of the upright exhaust stacks 25 which in turn are in communication with a vacuum source.

The frames 16 of each of the storage trays 15–32 are formed with a central, longitudinally extending slot 26 extending the length of the frame and terminated by end plates 27 which close the ends of the frames. Shafts 29, 30 and 31 (FIGURE 1) are journalled in identical bearings 28 mounted on the end plates 27 and rotatably support pulleys 34 over which conveyor belts indicated at 33 are entrained. The belts 33 of each frame are operable in pairs and travel the length of the frames 16 of storage trays 15 and 32 with their top run providing sheet conveying means in the direction indicated by applied arrows of FIGURE 1. The opposing sidewalls 33A of each belt in combination with the upper surface of the frame, indicated at 16A, and the bottom side of veneer sheet S define additional areas indicated at B of reduced or negative pressure similar to the first mentioned areas A.

Storage trays 32 are supported by the standards 23 in an inclined, converging manner for the purpose of locating their discharge ends within the proximity of tray off-loading means 40. The frames 16 of the inclined storage trays 32 and associated belts 33 are offset inwardly to permit shaft 30 to accommodate the eight pulleys of the type indicated at 34 interposed between the adjacent ends of storage trays 15 and 32. The pulleys referred to immediately above are mounted in a staggered manner similar to the pulley arrangement of FIGURE 5. The endless belts 33 are driven by an electric motor 35 through power transmission means 36 and may be energized from a current source through switch means (not shown) carried at the receiving or forward end of each storage tray 15 and actuated by the leading edge of successive sheets of veneer passing thereover, whereby intermittent operation of the motor 35 will advance each sheet a distance approximately equal to the sheets length upon being deposited on the storage tray.

The off-loading means indicated generally at 40 of FIGURE 1 constitutes one end of a grading zone GZ or station at the other end of which is provided a grader tipple indicated generally at 50 of FIGURE 1A. Both the off-loading means 40 and the grader tipple 50 are swingably supported by and operate in conjunction with an intermediate transfer table indicated generally at 41.

The off-loading means 40 as previously mentioned is structurally identical to the grader tipple shown in FIGURE 4 and includes a main and secondary vacuum box, two pairs of endless belts, shafts and bearings as is described as follows in conjunction with the grader tipple 50. An exhaust conduit is indicated at 43 and is secured at one of its ends to the underside of the box of the off-loading means 40. A pressure responsive cylinder 42 is hingedly attached to the underside of the off-loading means 40 for positioning the latter within a vertical plane opposite the discharge end of storage trays 32. A control panel (not shown) is provided the off-loader operator in circuit with valve means for actuation of cylinder 42. The off-loader operator is provided with secondary controls for the electric motors indicated at 35 associated with the storage trays as well as a drive motor 45 for the belts 46 of the conveyor table 41 which drive indirectly by means of pulleys mounted on a common shaft 57 pairs of belts carried by the off-loading means 40 and similarly belts 56 of the grader tipple 50 in the offset manner typical shown in FIGURE 5.

The conveyor table 41 is of box type construction whose interior is in communication by means of a pair of exhaust stacks 47 with a vacuum source of the type previously noted which draws a flow of air into elongated openings 48 spaced along the upper surface of the table. Standards as at 49 support table 41 upon a platform 44 by a U-bolt arrangement similar to the manner in which the storage trays are supported. Table 41 terminates in end walls 44 provided with inset areas 44A for reasons hereinafter set forth.

Successive sheets of veneer as they advance are deposited by belts 46 of the conveyor table onto the grader tipple 50, best shown in FIGURES 4 and 5, where an individual termed a "grader" momentarily inspects each sheet and discharges it according to quality and size onto vertically disposed transfer trays indicated generally at 80.

The following detailed description of the grader tipple 50 is applicable to the off-loading means 40. The grader tipple 50 is briefly described as a mechanism having a function similar to the previously described tipple acting transfer mechanisms 1 with the addition of a secondary tipple indicated generally at 70 pivotally mounted to the positionable end of grader tipple 50 and comprising a part thereof. Specifically the grader tipple 50 includes a main rectangular vacuum box 51 of light gauge, formed metal having inset areas as at 52A (FIGURE 6) and 53A within its front and rear walls indicated at 52 and 53 for the partial enclosure of forward and rearward sets of pulleys 54 and 55 respectively. Pairs of belts 56 carried by the sets of pulleys 54 and 55 and particularly the upper run thereof travel as indicated in pressureless contact across the upper surface 51A of the box. The shaft 57 is journalled in bearings 58 and 59 the latter of which are mounted upon one end of the conveyor table 41 and along with shaft 57 pivotally support one end of the grader tipple 50. Shaft 60 is rotatably supported at the opposite end of the box 51 by bearings 61. As best shown in FIGURE 5 the pulleys 55 are of a lesser diameter than pulleys 54 in order to position the upper and lower runs of belts 56 along the corresponding inclined surfaces of the box 51. Provided along the upper surface 51A of the main vacuum box 51 and centrally disposed between the belts 56 of each pair of belts are air openings 62 through which a continuous flow of air is drawn by a vacuum source in communication with the interior of the box by flexible conduit 63 attached to an annular projection 63A on the underside of said box. The area designated C provides still another zone of reduced pressure which depending on the sheets position, may extend over pulleys 54–55 to retain partially received or partially discharged veneer sheets on the belts 56. A downwardly curved extension 64 of the upper surface 51A provides support for the central area of a veneer sheet to prevent snagging of its forward end as it traverses the space between the conveyor table 41 and the vacuum box 51.

Pressure responsive means 65 provides a multiple position support for box 51 for swinging movement thereof about the shaft 57. Means 65 may consist of two pneumatic cylinders joined at their bases with the ends of their two piston rods pivotally mounted respectively to the platform 44 (FIGURE 1A) and the underside of the main vacuum box 51 by means of a plate 64 depending therefrom. Centrally disposed from front to rear interior of box 51 is a stiffener plate 66.

As aforementioned, a secondary tipple indicated generally at 70 is carried at the positionable end of the grader tipple 50 by the shaft 60 and bearings 74 the latter being carried by the secondary tipple. A secondary vacuum box 71 for the secondary tipple while of substantially less length than box 51 of the grader tipple is similar thereto in that it is provided with inset areas 72A at its forward end within a front wall 72. The inset areas 72A partially enclose, in cooperation with inset areas 53A, pulleys 55 for restriction of airflow between adjacent boxes 51 and 71. Secondary tipple belts 73 are carried by pairs of pulleys 55 and 75 the latter being carried by shafts 78 journalled slightly interior of rear wall 76 of vacuum box 71. The interior or chamber of the secondary vacuum box 71 is provided with a continuous source of vacuum for veneer sheet retention by two pairs of telescopic ducts as at 79 in communication with vacuum box 51 thus providing for a flow of air through openings 71A in upper surface of box 71.

The secondary tipple 70 is positioned about the shaft 60 by pressure responsive means 77, which may be of the same type as that indicated at 65 but having a separate circuit and controls for the positioning thereof as shown in broken lines in FIGURE 4. One end of the pressure responsive means is pivotally attached to the plate 64 while the opposite end is attached in a like manner to a plate 71B depending from the box 71.

From the above it is evident that veneer sheets, according to their quality and size may be selectively and positively discharged in an accurate manner by the "grader" onto vertically spaced transfer trays indicated generally at 80, which in their entirety provide a transfer zone TZ. Transfer trays 80 shown diagrammatically in FIGURE 1A receive the veneer sheets from the grader tipple 50 for deposit at the opposite end of the trays into individual collecting bins 90 constituting a receiving zone and representing different grades and sizes of veneer. Each of transfer trays consists of a pair of belt supporting frames 81 similar in section with the frames 16 of the storage trays 15 and 32 as shown in FIGURE 3. The frames 81 may be formed with a reduced sectional area adjacent the grader tipple 50 for the purpose of minimizing the operational travel of the latter. The transfer trays as shown in side elevation of FIGURE 1A are supported by standards 82 in diverging relationship to one another to provide spaced apart discharge points above their respective bins 90 constituting a receiving zone RZ in which the veneer sheets are received and stacked. Pairs of belts 83 carried by each of the transfer trays are continuously driven by motors 84 and transmission means 85.

In operation of the apparatus the strips of veneer are received at the clipper machines 2 in a more or less continuous manner whereupon they are trimmed and cut into sheets of desired lengths. The sheets are then selectively transferred to unfilled storage trays 15–32 by means of transfer mechanisms 1. The clipper operator of each machine 2 through control means provided him positions the transfer mechanism 1 to load successive sheets onto one of the three trays shown whereupon on completion of loading that particular storage tray the transfer mechanism will be repositioned. The filling of a tray 15–32 may be indicated by switch means or visual observation. Such switch means may for example be in the form of a sheet actuated feeler switch located at the discharge end of storage trays 32 for engagement by the first veneer sheet which has intermittently been advanced along the storage tray.

The operator of the off-loading means 40 by positioning the latter may unload any of the six storage trays 32. Control means also in circuit with motors 35, are provided the off-loading operator for operation of the belts of the selected storage tray. It will be seen from the foregoing that a continuous steady flow of veneer sheets will be received into the grading zone as compared with the irregular reception of veneer sheets traveling a single horizontal path from a single clipper machine.

The grader tipple 50 including the secondary tipple 70 is positioned opposite any one of the several transfer tray ends according to size and quality of the veneer sheet thereon as determined by the "grader."

Control means operable by the grader includes independent circuits for cylinders 65 and 77. In a typical operation exemplary control means may provide for positioning the secondary tipple 70 in a downward position relative to the grader tipple for the highest grade of any particular size and conversely, for the lower grade positioned in alignment with the grader tipple. Such control means would allow the grading function to be accomplished to a large extent be simply positioning the secondary tipple with movement of the grader tipple being necessary only when different length sheets are discharged.

The highly flexible nature of the veneer sheets and their lightweight enables the apparatus described having areas of reduced air pressure to positively control the sheets throughout their travel.

The partial enclosure of the pulleys 54–55 within inset areas 44A, 52A and 53A and later described cooperating inset areas 72A of the secondary tipple 70, along with enlarged intermediate portions 54A and 55A between adjacent pairs of pulleys, tend to restrict the flow of air into the area designated at C.

While I have shown a particular form of embodiment of my invention I am aware that many minor change therein will readily suggest themselves to others skilled in the art without departing from the spirit and scope of the invention.

Having thus described my invention what I claim as new and desire to protect by Letters Patent is:

1. Apparatus for conveying and sorting semi-rigid sheet material along inclined paths extending in a single longitudinal direction, said apparatus comprising a storage zone, a grading zone, a transfer zone and a receiving zone all arranged contiguously and successively conveying the sheet material in said direction, conveyor means for said sheet material within each of said zones with said conveyor means in said storage and transfer zones comprising vertically spaced apart trays, suction means within said storage and grading zones subjacent said conveyor means whereby the underside of sheet material conveyed therein will be subjected to a reduced atmospheric pressure resulting in pressured contact with said conveyor means.

2. Apparatus for conveying and sorting sheet material along inclined paths, said apparatus comprising a storage zone, a grading zone, a transfer zone and a receiving zone all arranged contiguously, conveyor means for sheet material within each of said zones including both fixed conveyor means and positionable conveyor means within said storage and grading zones with the latter conveyor means adapted for movement about a horizontal axis for the conveying of sheet material to said fixed conveyor means, and suction means within said storage and grading zones subjacent said conveyor means whereby the underside of sheet material conveyed therein will be subjected to a reduced atmospheric pressure resulting in pressured contact with said conveyor means.

3. Apparatus for conveying and sorting sheet material along inclined paths including, conveyor means divided into a storage zone, a grading zone, a transfer zone and a receiving zone, all of said zones arranged contiguously, vertically spaced storage trays within said storage and transfer zones provided with said conveyor means, sheet transfer mechanisms within said storage zones for transferring sheet material to selected vertically spaced storage trays, off-loader means within said grading zone adjacent the end of said storage zone for off-loading sheet material from one of said storage trays, grader tipple means within said grading zone swingably positionable within a vertical plane for the discharge of sheet material onto one of said vertically spaced storage trays within said transfer zone for subsequent transfer to a receiving zone at the opposite end thereof.

4. The invention as claimed in claim 3 wherein said sheet transfer mechanisms, said off-loader means and said grader tipple include vacuum conduit means whereby an area of reduced atmospheric pressure is provided subjacent the sheet material to accomplish pressured engagement of the sheet material and said conveyor means.

5. Apparatus for sorting sheet material comprising, a storage zone having vertically spaced transfer mechanisms, means hingedly attaching said mechanisms to supports therefor, positioning means coupled to said mechanisms and to said supports for movement of said mechanisms in a swinging manner for the discharge of sheet material into selected vertically spaced storage trays, said zone further comprising elongated vertically spaced storage trays one end of which is located adjacent said transfer mechanisms and terminating at their opposite ends adjacent a grading zone, and endless conveyor means carried by said trays, a grading zone comprising off-loader means and grader tipple means, hinge means attaching said off-loader and tipple means to a support therefor, positioning means coupled with said off-loader and said tipple for positioning the same in an arcuate manner about said hinge means for selectively off loading sheet material from said trays and subsequently depositing sheet material according to grade and size onto vertically spaced transfer trays within a transfer zone, a transfer zone comprising elongated vertically spaced transfer trays with one end of said transfer trays adjacent said grader tipple means and terminating at opposite ends adjacent a receiving zone thereof.

conveyor means associated with said transfer mechanisms and storage trays, said off loader means, said grader tipple means and said transfer trays, and vacuum conduit means in communication with each of said transfer mechanisms, off loader means and grader tipple means whereby sheet material in place thereupon will be subjected to areas of reduced atmospheric pressure causing retention of the material on said conveyor means.

6. Apparatus for conveying and sorting sheet material along inclined paths comprising, a storage zone having vertically spaced transfer mechanisms each hingedly carried by a support and provided with conveyor means, positioning means coupled to said support and said transfer mechanisms, vacuum conduit means in communication with said transfer mechanisms and a source of reduced atmospheric pressure to provide a first area of reduced pressure superjacent said transfer mechanisms, elongated vertically spaced storage trays intermediate said transfer mechanisms and a grading zone, said trays including endless conveyor means extending the length thereof, a grading zone comprising storage tray off-loader means and grader tipple means, hinge means attaching said off-loader means and said grader tipple means to an intermediate support therefor, first positionable means coupled to said off-loader means and to a base and second positionable means coupled to said grader tipple means and to a base for swingably locating said off loading means and said grader tipple means about their respective hinge means, vacuum conduit means in communication with said off-loader means and said grader tipple means and a source of reduced atmospheric pressure to provide a second area of reduced pressure superjacent said off loading means and said grader tipple means, and conveyor means carried by both of said last mentioned means for the conveying of sheet material along inclined paths over said off-loader means and said grader tipple means, a transfer zone comprising elongated, vertically spaced, transfer trays, one end of said transfer trays adjacent said grader tipple means for the reception of sheet material and terminating at their opposite ends at a receiving zone.

7. The apparatus as claimed in claim 6 wherein both said off-loader means and said grader tipple means each comprise a vacuum box having air openings in their top surfaces and wherein said conveyor means carried by said off loader means and said grader tipple means comprise endless belts, entrained over pulleys the latter inset within opposite end walls of the vacuum boxes.

8. The apparatus as claimed in claim 6 wherein both said off-loader means and said grader tipple means each comprise a main vacuum box and a secondary vacuum box in communication therewith, means hingedly interconnecting said main and secondary boxes and, means carried by said main vacuum box for positioning said secondary vacuum box about the hingedly interconnecting means.

9. In an apparatus for conveying and sorting, sheet material grader tipple means comprising in combination, a closed box member forming a chamber and having openings in its top surface, hinge means swingably attaching said member to a support for movement about a horizontal axis, conveyor means including endless belts entrained on pulleys in a manner positioning the upper run of said belts in sliding contact with the top surface of said box member, each of said belts being transversely offset in opposite directions from the openings in said box to define in conjunction with sheet material being carried thereby an area of reduced atmospheric pressure, positionable means coupled with said member for selectively moving the latter about said horizontal axis to a desired operational position, vacuum conduit means in communication with the chamber formed by said box and with a source of reduced atmospheric pressure to cause a downward flow of air through said openings whereby sheet material in place on said conveyor means will be subjected to said pressure insuring retention thereof regardless of the operational position of said box member.

10. In an apparatus for conveying and sorting sheet material grading means comprising in combination, a main vacuum box and a secondary vacuum box each forming a chamber and having openings in their top surfaces, first hinge means swingably connecting said main and secondary vacuum boxes along a first horizontal axis, second hinge means swingably attaching said main vacuum box to a support for movement about a second horizontal axis, conveyor means rotatably mounted on said main and secondary vacuum boxes, means coupled with said main vacuum box for selectively moving the latter about said second horizontal axis, to a desired operational position, means coupled with said secondary vacuum box for selectively moving the latter about said first horizontal axis to a desired operational position, and vacuum conduit means in communication with the chamber provided by said main vacuum box and the chamber provided by said secondary vacuum box and with a source of reduced atmospheric pressure to cause a downward flow of air through said openings whereby sheet material in place on said conveyor means will be subjected to said reduced pressure insuring retention thereof regardless of the operational position of said main and secondary vacuum boxes.

11. The invention as claimed in claim 10 wherein said conveyor means comprises endless belts and pulleys therefor in a manner positioning the upper run of said belts in sliding contact with the top surfaces of said main vacuum box and said secondary vacuum box.

12. The invention as claimed in claim 11 wherein said openings in the top surfaces of said main and said secondary vacuum boxes are located adjacent the upper run of said belts to provide an area of reduced atmospheric pressure intermediate said belts.

13. The invention as claimed in claim 12 wherein said main vacuum box and said secondary vacuum box are provided with inset areas in their end walls for the partial enclosure of said pulleys permitting the top surface of said main vacuum box and said secondary vacuum box and the area of reduced atmospheric pressure associated therewith to overlay a segment of said pulleys.

14. A method of conveying, storing and sorting sheet material consisting of the steps of transferring said material along a tiltable surface having endless conveyor means associated therewith, while simultaneously subjecting said material to a subjacent area of reduced atmospheric, discharging said sheet material onto one of a plurality of vertically spaced storage trays for temporarily storing the same, transferring said material off of said storage trays along another tiltable surface having endless conveyor means associated therewith while simultaneously subjecting it to another subjacent area of reduced atmospheric pressure, advancing said sheet material along a horizontal path while visually grading same, sorting said sheet material according to its grade by transferring the same along still another tiltable surface having endless conveyor means associated therewith while simultaneously subjecting it to still another subjacent area of reduced atmospheric pressure, and depositing said sheet material according to its grade on to one of a plurality of vertically spaced transfer trays for transfer to a receiving zone.

15. A method of conveying and sorting flexible sheet material by grade in one direction consisting of the steps of advancing said sheet material along a horizontal path while visually grading the same, sorting said sheet material according to its grade by transferring the same along main and secondary tiltable surfaces having endless conveyor means associated therewith while continuously subjecting said material to subjacent areas of reduced pressure common to both titlable surfaces, and depositing said sheet material according to its grade on to one of a plurality of vertically spaced transfer trays for transfer to a receiving zone.

16. A tipple machine having a vacuum box forming a chamber with the upper surface thereof defining rows of spaced apart openings, hinge means swingably attaching said vacuum box to a support for movement about a horizontal plane, pairs of endless belts rotatably mounted on said vacuum box in a manner positioning the upper row of said belts in sliding contact with the top surface of said vacuum box and each belt transversely spaced from said row of openings, means coupled with said vacuum box for selectively moving the latter about said horizontal axis to a desired operational position, vacuum conduit means in communication with the chamber provided by said vacuum box and with a source of reduced atmospheric pressure to cause a downward flow of air through said openings, and said endless belts serving to restrict the flow of air into said openings in conjunction with the sheet material carried thereby to insure retention of the material regardless of the inclined postion of said vacuum box.

References Cited

UNITED STATES PATENTS

| 2,476,371 | 7/1949 | Haumann | 214—11 |
| 2,478,610 | 8/1949 | Uschmann et al. | 271—64 |
| 2,538,972 | 1/1951 | Magnani | 271—74 |
| 2,901,250 | 8/1959 | Martin | 271—68 |
| 3,227,275 | 1/1966 | Cody | 209—125 |
| 3,288,462 | 11/1966 | Liva | 271—64 |
| 3,288,465 | 11/1966 | Cook | 271—74 |
| 3,291,282 | 12/1966 | Pedagno | 271—74 |

FOREIGN PATENTS 714,974   12/1941   Germany.

ALLEN N. KNOWLES, *Primary Examiner.*

J. N. ERLICH, *Assistant Examiner.*